United States Patent [19]
Filipek

[11] Patent Number: 5,530,446
[45] Date of Patent: Jun. 25, 1996

[54] HIGHWAY TRAFFIC RADAR SIGNAL EMITTING SYSTEM

[76] Inventor: James S. Filipek, 620 Washington Ave., Kenilworth, N.J. 07033

[21] Appl. No.: 419,438

[22] Filed: Apr. 10, 1995

[51] Int. Cl.⁶ ............................................. G01S 7/38
[52] U.S. Cl. ............................................. 342/13
[58] Field of Search ........................... 342/13, 20

[56] References Cited

U.S. PATENT DOCUMENTS

| | | | |
|---|---|---|---|
| 4,841,302 | 6/1989 | Henry | 342/20 |
| 5,005,661 | 4/1991 | Taylor et al. | 342/104 |
| 5,122,802 | 6/1992 | Marin | 342/13 |
| 5,151,701 | 9/1992 | Valentine et al. | 342/20 |
| 5,428,530 | 6/1995 | Brown et al. | 342/13 |

*Primary Examiner*—Daniel T. Pihulic

[57] ABSTRACT

The highway traffic radar signal emitting system of the invention is arranged to employ a plurality of radar emitting housings positioned along a highway at spaced intervals, to include housings positioned along the median portion of a highway as well as orienting such housings on support posts, such as sign posts, light posts, and the like. Each of the housings employs a storage battery recharged by a solar cell, with the solar cell and battery in electrical communication with a radar transmitter, such that an emitter portion of the radar transmitter directs radar signals from the housing for reception by radar detection units employed by drivers.

3 Claims, 4 Drawing Sheets

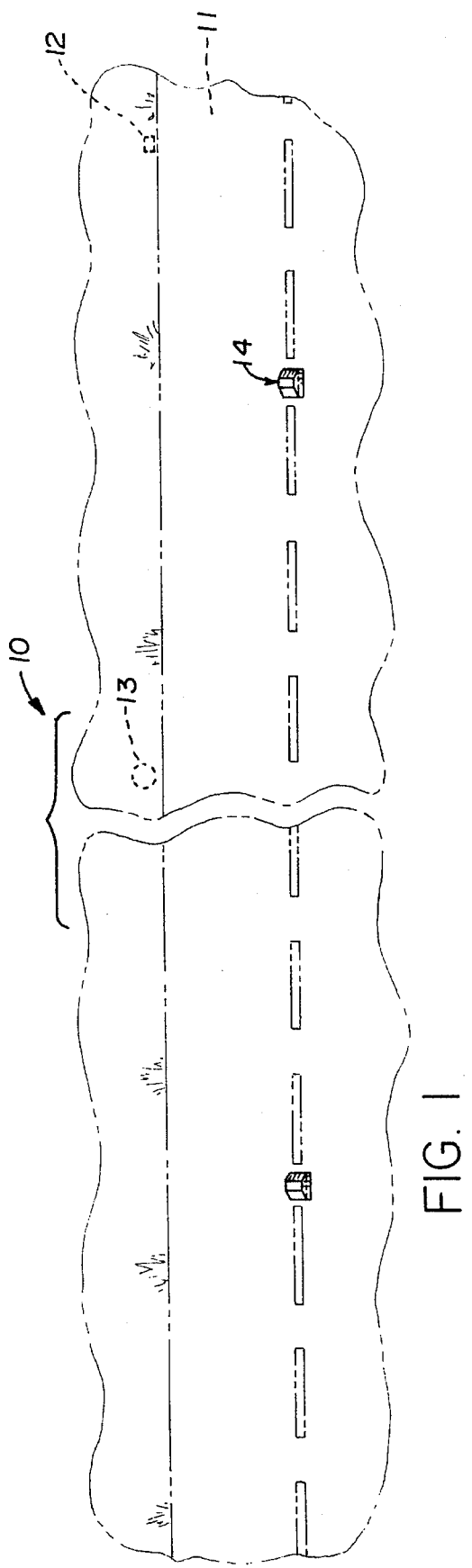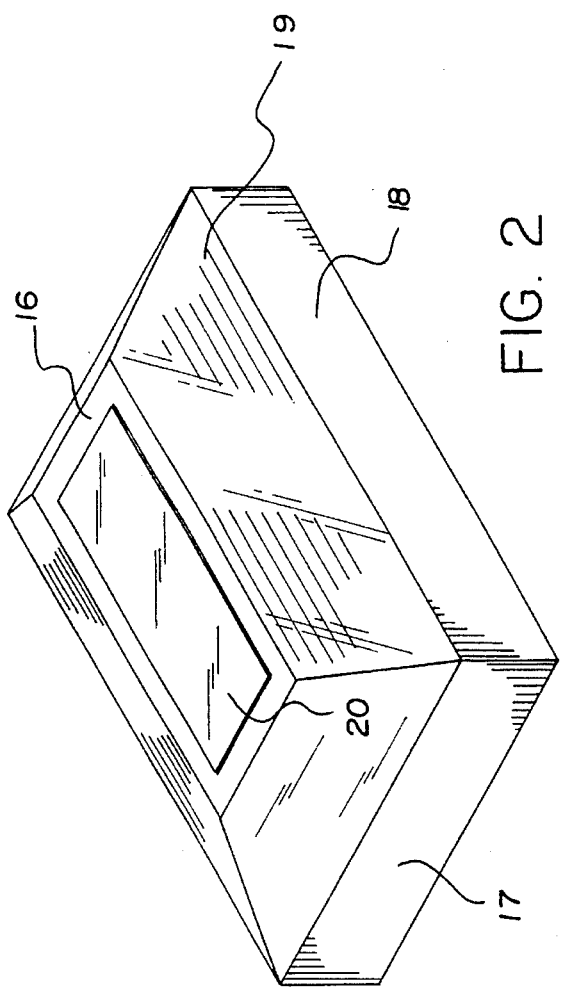

HIGHWAY TRAFFIC RADAR SIGNAL EMITTING SYSTEM

TECHNICAL FIELD

The field of invention relates to traffic control devices, and more particularly to a system wherein at least one, and typically a plurality of, spaced radar emitter are positioned at intervals along a highway accommodating self-propelled vehicles, such that vehicles having radar detectors are induced to more closely follow traffic control laws in a belief by drivers of those vehicles that radar speed detecting devices are employed.

BACKGROUND OF THE INVENTION

Various prior art radar emitting structures are available in the prior art as exemplified by the U.S. Pat. Nos. 4,841,302; 5,151,701; and 4,335,382.

The instant invention is directed to improvements over the prior art such that radar detecting devices are not utilized but merely radar emitting signals are provided in an effort to induce drivers in a belief that a "radar trap" is available to have such drivers more readily obey traffic control laws.

SUMMARY OF THE INVENTION

The highway traffic radar signal emitting system of the invention is arranged to employ a plurality of radar emitting housings positioned along a highway at spaced intervals, to include housings positioned along the median portion of a highway as well as orienting such housings on support posts, such as sign posts, light posts, and the like. Each of the housings employs a storage battery recharged by a solar cell, with the solar cell and battery in electrical communication with a radar transmitter, such that an emitter portion of the radar transmitter directs radar signals from the housing for reception by radar detection units employed by drivers.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view indicating the invention in the orientation and positioning of a plurality of radar emitting members along a highway subject to traffic control.

FIG. 2 is a perspective illustration of a radar emitting housing utilized by the invention.

DESCRIPTION OF THE PREFERRED EMBODIMENT

As required, detailed embodiments of the present invention are disclosed herein; however, it is to be understood that the, disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 3:
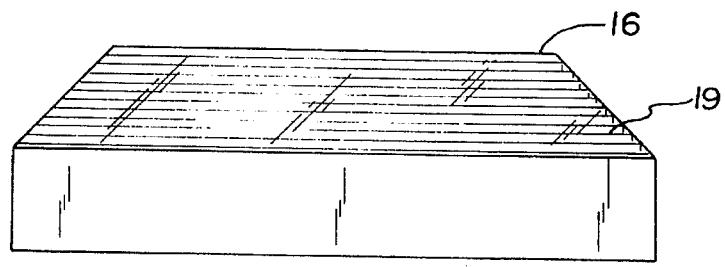
FIG. 3 is a side elevational view of the housing structure, as indicated in FIG. 2.
Figure 4:
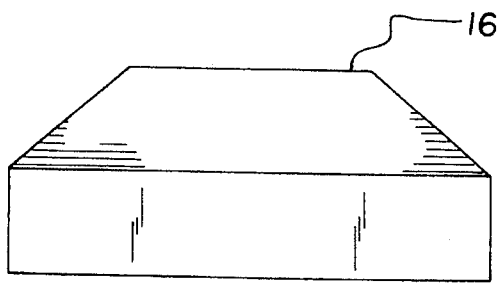
FIG. 4 is an end view, taken in elevation, of the housing as indicated in FIG. 3.
Figure 5:
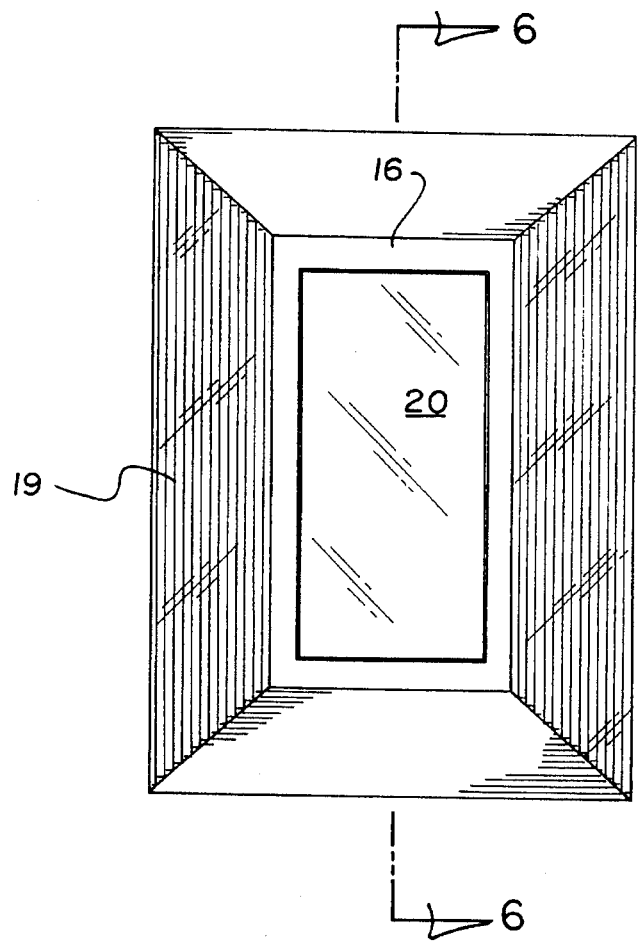
FIG. 5 is a top plan view of the housing structure, as indicated in FIG. 2.
Figure 6:
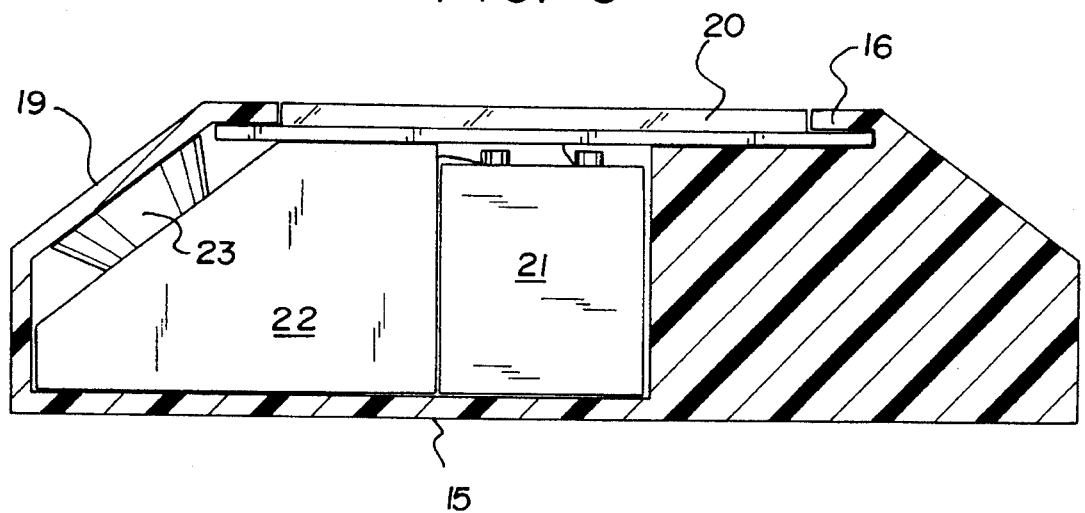
FIG. 6 is a cross-sectional illustration, taken along the lines 6—6 of FIG. 5 as indicated.
Figure 7:
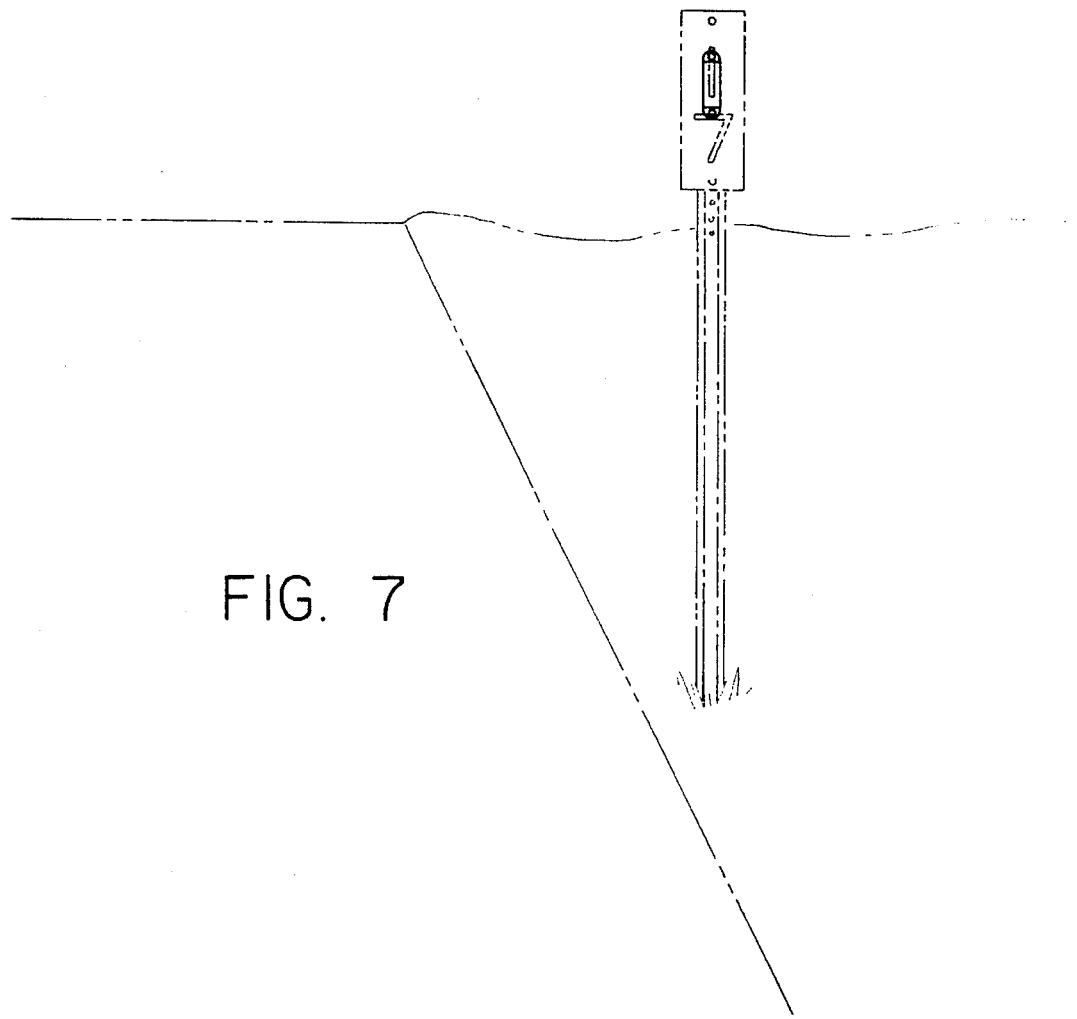
FIG. 7 is a plan view, taken in elevation, of a modified housing structure mounted relative to a sign post member.

The highway traffic radar signal emitting system 10 of the invention, as indicated in FIG. 1, is directed to the placement and positioning of a plurality of radar emitting members to include positioning of at least one, and typically a plurality of, housings 14, as well as potentially the placement of housings 14a and 14b (see the FIG. 8 and 9 for example), along the highway 11 medially of that highway 11, as indicated in FIG. 1, as well as positioning such members on posts to include a sign post 12 and a light post 13 as an example. To this end, at least one housing 14 is provided, and that housing 14 includes a bottom wall 15 spaced from a top wall portion 16. The housing 14 is provided with end walls 17, as well as side walls 18, with at least one of the side walls 18 having a shield wall formed of a radar transmissive material 19, such that a radar transmitter 22 positioned within the housing (see FIG. 6) emits radar signals through an emitter portion 23 that is oriented adjacent to the shield wall material 19. The radar transmitter 22 may be of any convenient construction, such as indicated and exemplified by the U.S. Pat. Nos. 4,335,382; 5,083,129; and 5,151,701 each of which is included herein by reference.

Figure 8:
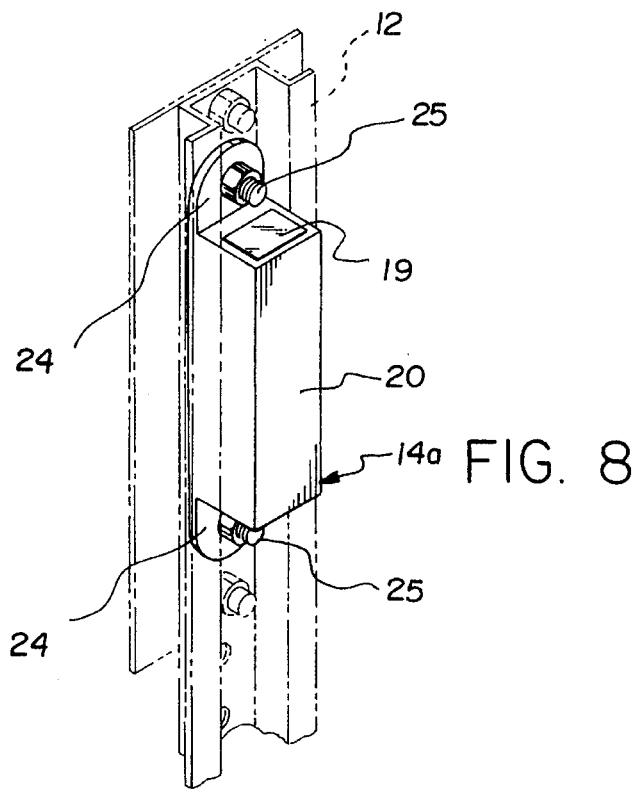
FIG. 8 is an enlarged, perspective illustration of the modified housing structure as mounted to the sign post member.
Figure 9:
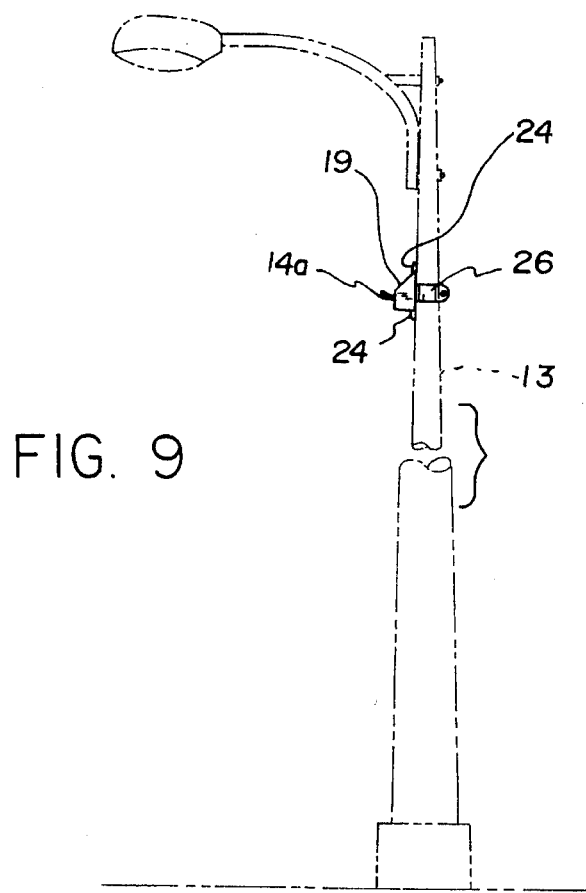
FIG. 9 is a side view, taken in elevation, of a further modified housing member mounted to a light post.

A modified housing structure 14a includes at least one, and typically a plurality of, mounting flanges 24 extending from the bottom wall of the housing 14a, such that fasteners 25 are provided with one directed through each of the mounting flanges 24 for fastening to the sign post 12. The further modified housing 14b, such as indicated in FIG. 8, includes a securement strap in addition to the flanges 24a, with the securement strap 26 indicated for surrounding engagement of the post member 13.

In this manner, each of the radar emitting members, to include the housings 14, 14a, and 14b, provide a radar signal to be received by motorists that typically have radar receiving units known as "radar detectors" to induce such motorists to believe that a "radar trap" is in progress and thereby induce such motorists to more readily obey prevailing traffic laws and regulations.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A method of traffic control to include the steps of providing at least one radar emitting member and positioning that radar emitting member fixedly and medially onto a vehicular highway.

2. A method as set forth in claim 1 wherein the step of providing a radar emitting member includes the step of providing a housing, with the housing having a housing cavity, with the housing cavity having positioned therewithin a storage battery, and the housing further having a solar panel directed into the housing for recharging the battery, and having a radar transmitter within the cavity, and the battery effecting function of the radar transmitter to direct a radar signal from the housing.

3. A method as set forth in claim 1 including the step of providing at least one further radar emitting member fixedly and medially onto the highway, where said further radar emitting member is spaced from the at least one radar emitting member.

* * * * *